Patented Apr. 18, 1950

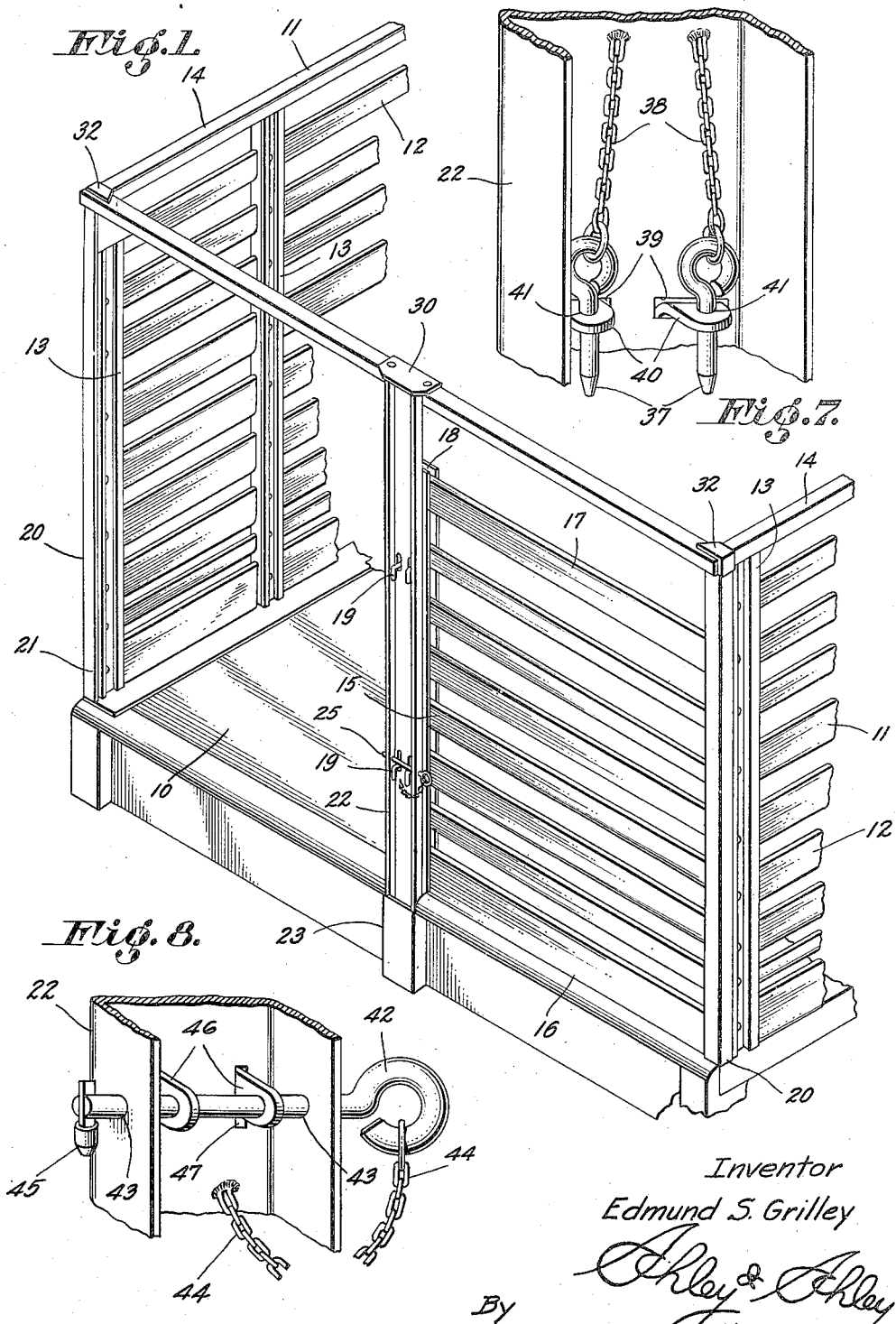

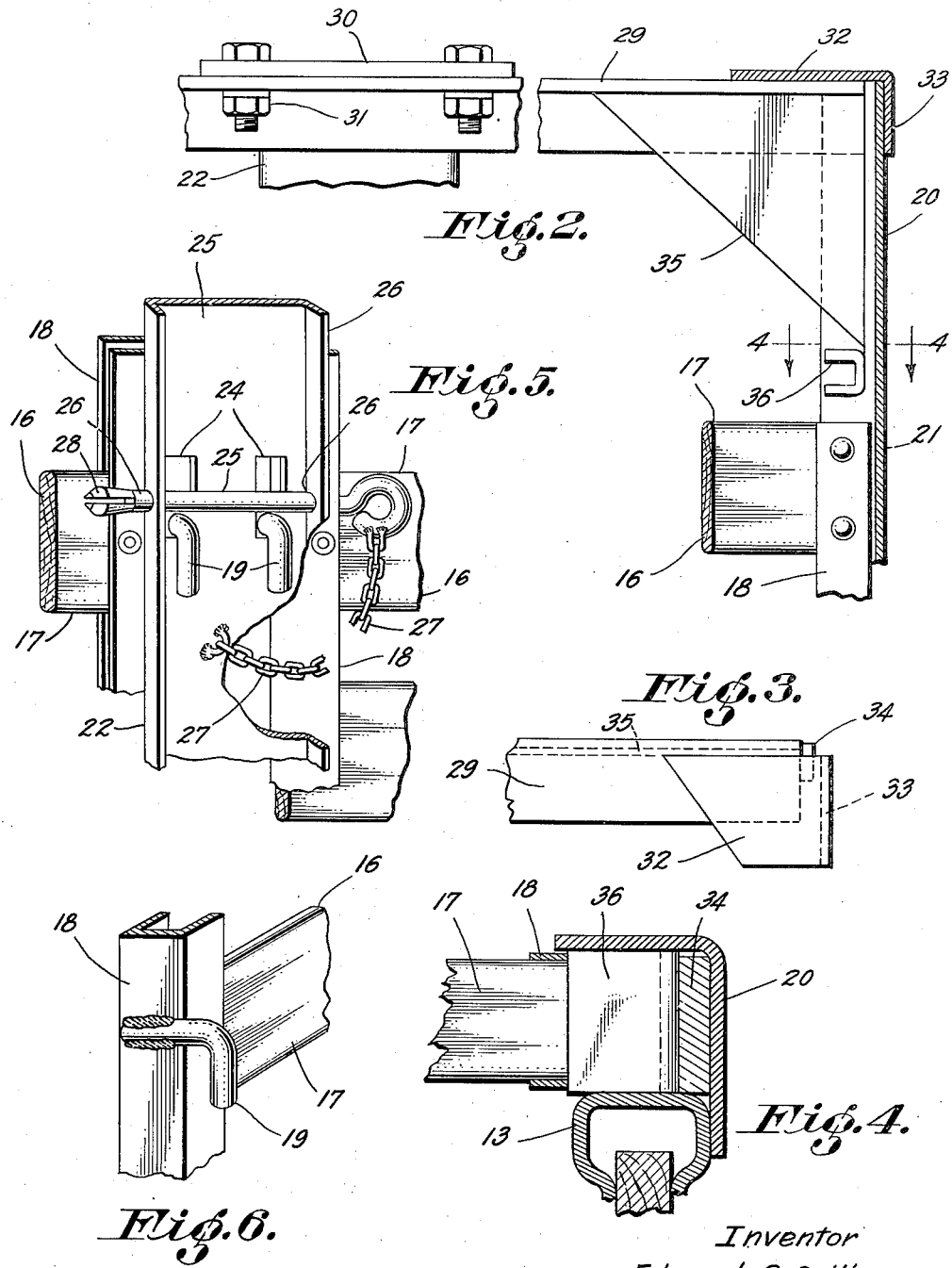

2,504,326

UNITED STATES PATENT OFFICE 2,504,326

VEHICULAR TAIL GATE

Edmund S. Grilley, Fort Worth, Tex., assignor to Hobbs Manufacturing Company, Fort Worth, Tex., a corporation of Texas Application November 8, 1948, Serial No. 59,012

12 Claims. (Cl. 296—53)

This invention relates to new and useful improvements in vehicular tail gates.

One object of the invention is to provide an improved tail gate for a vehicle body which is of such construction that the same may be installed and removed by one person.

Another object of the invention is to provide an improved vehicular tail gate which is made in sections and has a support to which the sections are detachably connected so as to facilitate installation and removal.

A further object of the invention is to provide an improved tail gate, of the character described, wherein the support is detachably connected to the base and side racks of the vehicle so as to permit the complete disconnection of the tail gate of the vehicle.

Still another object of the invention is to provide an improved tail gate, of the character described, having novel means for attaching and securing the tail gate sections or racks in position.

A construction designed to carry out the invention will be hereinafter described together with other features of the invention.

The invention will be more readily understood from a reading of the following specification and by references to the accompanying drawings wherein an example of the invention is shown, and wherein:

Fig. 1 is perspective view of a tail gate, constructed in accordance with the invention, and shown mounted on a vehicle with one gate section removed, Fig. 2 is a front elevation, partly in section, of a portion of the tail gate and its support, Fig. 3 is a plan view of one end of the support, Fig. 4 is an enlarged, horizontal, cross-sectional view, taken on the line 4—4 of Fig. 2, Fig. 5 is an enlarged perspective view of the latch for fastening the gate sections to the upright of the support, Fig. 6 is a perspective view of a portion of one gate section, showing one of its hooks, and Figs. 7 and 8 are perspective views showing modified forms of latching means.

In the drawings, the numeral 10 designates the floor or bed of a trailer or other vehicle having side racks or panels 11. Each panel includes longitudinal slats or bars 12 carried by upright posts or stakes 13 which engage within suitable pockets (not shown) formed along the margins of the bed 10. A top rail or bar 14 of channel form overlies and connects the upper ends of the stakes 13. For closing the back or rear end of the vehicle, a removable end or tail gate 15 is provided and includes a pair of upright racks or sections 16. Each gate section has a plurality of parallel, transverse bars or slats 17, of wood or other suitable material, with their ends confined within and connected by a pair of upright members or rails 18 of channel form. A pair of transverse, angular hooks or lugs 19 are welded or otherwise secured to the end surface or web of each inner channel member 18 so as to project rearwardly and downwardly therefrom when the gate section 16 is in place.

For supporting the gate sections, an upright angle bar or member 20 is welded or otherwise secured to the rear stake 13 of each side panel with one flange overlying the outer surface of said stake and its other flange extending inwardly in spaced relation to the end or rear surface of said stake (Figs. 2 and 4). The angle bars 20 are substantially coextensive with the stakes and coact with said stakes to provide elongate recesses or keepers 21 for receiving the outer margins or channel members 18 of the gate sections.

An upright channel or post 22 of substantially channel shape engages within a medial socket or pocket 23 carried by the rear of the vehicle bed 10 whereby the channel projects upwardly between the angle bars 20. The flanges of the channel 22 project rearwardly and the forward surface of its flat web is adapted to be engaged by the rear or outer surfaces of the inner channel members 18. As is most clearly shown in Fig. 5 elongate openings or slots 24 are formed vertically in the web of the channel adjacent its flanges for receiving the hooks 19. With the outer margins of the gate sections confined within the keepers 21 and the hooks engaged with the slots 24, said gate sections are held against displacement. For locking the gate sections in place, a latch element 25 in the form of an eye bolt or pin is adapted to overlie the lowermost hooks and extends through alined openings 26 formed in the channel flanges adjacent the slots. A suitable chain 27 fastens one end of the pin 25 to the channel web, while the opposite end of said pin is preferably slotted and flared outwardly as shown by the numeral 28 to prevent displacement of said pin from the openings 26.

The support, formed by the coaction of the upright angle bars 20 and channel 22, includes a transverse angle bar or member 29 having one flange directed downwardly and abutting the web of said channel, while its top flange is forwardly directed. A flat bracket or plate 30 carried by the upper end of the channel overlies the medial portion of the bar 29 and is secured thereto by suitable bolts and nuts 31. Each end of this angle bar has an angular clip or hook element 32 overlying and secured to its top flange. The outer end portions of the hook elements 32 project from the ends of the transverse bar and are bent downwardly in spaced relation thereto to provide lips 33 for engaging over the upper ends of the angle bars 20 and the adjacent portions of the top rails 14 (Figs. 2 and 3). A flat strap or arm 34, reinforced by an angular gusset 35, is secured to and depends from each end of the transverse bar at its rear edge and inwardly of the lip 33 of the hook element so as to engage within the upper end of the keeper or recess 21. The straps 34 are relatively long, depending below their gussets 35 and being confined within their respective recesses by U-shaped keepers or stops 36 which are welded or otherwise suitably attached to and between the inner surfaces of the upright bars and end or rear surfaces of the adjacent stakes 13 (Fig. 4).

Due to the arrangement of the support, the same may be readily assembled and dismantled. Upon unfastening the bolts and nuts 31, the transverse angle bar 29 may be raised so as to disengage the hook elements 32 and straps 34. The channel 22 then may be lifted from its pocket 23 and, if desired, the side panels 11 may be removed. When the channel and the transverse angle bar are connected and in place, the gate sections 16 may be readily installed by engaging their outer margins in their respective keepers 21 and moving their inner margins against the web of the channel. A slight upward movement of the gate sections permits engagement of the hook 19 with their respective slots 24 and said hooks are held against displacement by downward swinging of the latch element 25. Since the tail gate and its support are made in sections, it is readily apparent that the same may be installed and removed by one person. The gate sections may be readily removed by raising the same upwardly so as to disengage the hooks from their slots, the latch element being swung upwardly, and then sliding the same inwardly toward each other. This inward movement is permitted by the spacing of the sections from each other.

In Fig. 7, a modified form of latch is shown and includes a pair of eye bolts or pins 37 preferably attached to the outer surface of the web of the channel 22 by short chains 38. Transverse slots 39 are formed in the channel web for receiving ears or lugs 40 carried by the inner margins of the gate sections. The eye bolts 37 are adapted to engage within openings 41 formed in the ears 40 so as to latch the gate sections against displacement. Manifestly, the eyebolts and ears perform the same function as and may be substituted for the hooks 19 and latch element 25.

Another modified form of latch is shown in Fig. 8 and includes an eyebolt or pin 42 extending through alined openings 43 in the flanges of the channel 22. The pin 42 is preferably connected to the channel web by a short chain 44 and has a pivoted end portion 45 to prevent displacement. Perforated ears or lugs 46 carried by the inner margins of the gate sections are adapted to project through vertical slots 47 formed in the channel web so as to be engaged by the pin.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a vehicle having side racks, a tail gate including, channel means at the rear ends of the side racks, an upright post intermediate the channel means, a transverse member secured to the post and connected to the upper end portions of said channel means, a pair of gate sections having their outer margins engaged within said channel means and their inner margins abutting said post, and latch means detachably connecting the inner margins of the gate sections to said post.

2. The combination set forth in claim 1 wherein the latch means includes, lugs carried by the inner margins of the gate sections, and a latch element coacting with the lugs.

3. The combination set forth in claim 1 including, clips detachably connecting the transverse member to the channel means.

4. In a vehicle having side racks, a tail gate including, side members having recesses at the rear ends of the side racks, an upright intermediate the side members, a transverse member fastened to the upper end of the upright and having detachable connection with the upper portions of said side members, a pair of gate sections having their outer margins confined within the recesses and their inner margins abutting said upright, and latch means attaching the inner margins of said gate sections to said upright.

5. In a vehicle having side racks, a tail gate including, side members having recesses at the rear ends of the side racks, an upright intermediate the side members, a transverse member fastened to the upper end of the upright and having detachable connection with the upper portions of said side members, a pair of gate sections having their outer margins confined within the recesses and their inner margins abutting said upright, and lugs on the inner margins of said gate sections, and means carried by said upright for detachably latching the lugs thereto.

6. In a vehicle having side racks, a tail gate including, side members having recesses at the rear ends of the side racks, an upright intermediate the side members, a transverse member fastened to the upper end of the upright and having detachable connection with the upper portions of said side members, a pair of gate sections having their outer margins confined within the recesses and their inner margins abutting said upright, and lugs on the inner margins of said gate sections, said upright having openings for receiving the lugs, and latch means confining said lugs in the openings.

7. The combination set forth in claim 4 including, clips detachably connecting the transverse member to said side members.

8. In a vehicle having side racks, a tail gate including, side members having recesses at the rear ends of the side racks, an upright intermediate the side members, a transverse member fastened to the upper end of the upright and having detachable connection with the upper portions of said side members, a pair of gate sections having their outer margins confined within the recesses and their inner margins abutting said upright, latch means attaching the inner margins of said gate section to said upright, and angular clips carried by the ends of the transverse member and engaging over the upper ends of said side members for detachably connecting the same.

9. In a vehicle having side racks, a tail gate including, a central upright, a transverse member fastened to the upper end of the upright, means detachably connecting the ends of the transverse member to the rear ends of the side racks, a pair of gate sections extending across the rear of the vehicle with their inner margins abutting said upright, latch means attaching the inner margins of the gate sections to said upright, and keeper means at the rear ends of the side racks for receiving the outer margins of said gate sections.

10. The combination set forth in claim 9 wherein the connecting means includes, elements depending from the ends of the transverse member, and keepers at the rear ends of the side racks for receiving the elements.

11. The combination set forth in claim 9 wherein the latch means includes, lugs on the inner margins of the gate sections, the upright having openings for receiving the lugs, and a pin carried by said upright for engaging said lugs.

12. The combination set forth in claim 9 wherein the latch means includes, rearwardly projecting hooks on the inner margins of the gate sections, the upright having openings for receiving the hooks, and a latch element carried by said upright for engaging said hooks and confining the same in the openings.

EDMUND S. GRILLEY.

REFERENCES CITED

The following references are of record in the file of this patent:

UNITED STATES PATENTS

| Number | Name | Date |
| --- | --- | --- |
| 574,021 | Conderman | Dec. 29, 1896 |
| 947,193 | Burull | Jan. 18, 1910 |